United States Patent
Rice et al.

(10) Patent No.: US 8,578,357 B2
(45) Date of Patent: Nov. 5, 2013

(54) ENDIAN CONVERSION TOOL

(75) Inventors: Michael P. Rice, Beaverton, OR (US); Hugh Wilkinson, Newton, MA (US); Maximillian J. Domeika, Sherwood, OR (US); Evgueni V. Brevnov, Berdsk (RU); Peter Lachner, Heroldstatt (DE)

(73) Assignee: Intel Corporation, Santa Clara, CA (US)

( * ) Notice: Subject to any disclaimer, the term of this patent is extended or adjusted under 35 U.S.C. 154(b) by 988 days.

(21) Appl. No.: 12/643,216

(22) Filed: Dec. 21, 2009

(65) Prior Publication Data

US 2011/0154303 A1    Jun. 23, 2011

(51) Int. Cl.
*G06F 9/45*    (2006.01)

(52) U.S. Cl.
USPC ............................. 717/159; 717/114

(58) Field of Classification Search
USPC .................. 717/114–119, 151–167
See application file for complete search history.

(56) References Cited

U.S. PATENT DOCUMENTS

| | | | |
|---|---|---|---|
| 6,154,877 A * | 11/2000 | Ramkumar et al. | .......... 717/114 |
| 6,772,320 B1 | 8/2004 | Raj | |
| 7,552,427 B2 | 6/2009 | Adiletta et al. | |
| 2006/0125663 A1 | 6/2006 | Adiletta et al. | |
| 2009/0222800 A1 | 9/2009 | Adiletta et al. | |

FOREIGN PATENT DOCUMENTS

EP    0 729 093    8/1996

OTHER PUBLICATIONS

EvenHelix.com, "Byte Alignment and Ordering", Jan. 2008, Retrieved from Internet Archive http://web.archive.org/web/20080107015848, 3 pages.*
BetterExplained, "Understanding Big and Little Endian Byte Order", Jan. 2008, Retrieved from Internet Archive http://web.archive.org/web/20080108121138, 13 pages.*
U.S. Appl. No. 12/643,006, filed Dec. 21, 2009, entitled "Methods and Apparatuses for Endian Conversion," by Maximillian J. Domeika, et al.
Gilig, J.R., "Endian-Neutral Software, Part 2," Nov. 1, 1994, pp. 44, 46-49 and 51.
James, D.V., "Multiplexed Buses: The Endian Wars Continue," Jun. 1, 1990, pp. 9-21.
European Patent Office, European Search Report mailed Dec. 5, 2012 in European application No. 10252159.8-2211/2348406.

* cited by examiner

*Primary Examiner* — Ted T Vo

(74) *Attorney, Agent, or Firm* — Trop, Pruner & Hu, P.C.

(57) ABSTRACT

In one embodiment of the invention code (e.g., compiler, tool) may generate information so a first code portion, which includes a pointer value in a first endian format (e.g., big endian), can be properly initialized and executed on a platform having a second endian format (e.g., little endian). Also, various embodiments of the invention may identify problematic regions of code (e.g., source code) where a particular byte order is cast away through void pointers.

20 Claims, 4 Drawing Sheets

ENDIAN CONVERSION TOOL

BACKGROUND

Byte endianess is an attribute of data storage and retrieval. Big endian data or variables may be stored in memory in opposite byte order from little endian data or variables. Little endian data may be stored with the least significant byte in the lowest memory byte address while big endian data may be stored with the most significant byte in the lowest memory byte address. Big and little endian variables having the same value may be identical in CPU registers but may have differing order in memory.

Source code that is written using one byte endianess convention may not be executed on a platform using another endianess convention without recognizing the differing order of how some data are stored in memory. The following C code provides an example:

```
{
    int i = 0x12345678;
    char c = *((char*)&i);
}
```

The "c" will be 0x12 if the code is compiled and run on a big endian architecture but the "c" will be 0x78 if the code is compiled and run on a little endian architecture. Thus, to execute code written in one endianess convention on a computer system platform of another endianess convention may require endian conversion. This can be difficult when, for example, the source code includes unions or casts a first pointer (which points to data consisting of multiple bytes) to a second pointer (which points to data consisting of a single byte). Pointers can create difficulties because some bi-endian compilers do not track byte order through pointers, such as void pointers, and do not produce diagnostics for potential byte order change through such pointers. Thus, pointers and the like can lead to unforeseen byte order incompatibilities.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth. However, it is understood that embodiments of the invention may be practiced without these specific details. Well-known circuits, structures and techniques have not been shown in detail to avoid obscuring an understanding of this description. References to "one embodiment", "an embodiment", "example embodiment", "various embodiments" and the like indicate the embodiment(s) so described may include particular features, structures, or characteristics, but not every embodiment necessarily includes the particular features, structures, or characteristics. Further, some embodiments may have some, all, or none of the features described for other embodiments. Also, as used herein "first", "second", "third" and the like describe a common object and indicate that different instances of like objects are being referred to. Such adjectives are not intended to imply the objects so described must be in a given sequence, either temporally, spatially, in ranking, or in any other manner. Also, for clarity many example embodiments discussed herein address a compiler (e.g., C/C++ compiler) and its application to source code but embodiments of the invention are not necessarily so limited. For example, while embodiments include analytic code, such as an analytic tool included in a compiler, other embodiments may include analytic code included in other forms of code.

In one embodiment of the invention, code (e.g., compiler, tool) may generate information so a code portion, which includes a pointer value in a first endian format (e.g., big endian), can be properly initialized and executed on a platform having a second endian format (e.g., little endian).

Figure 1:
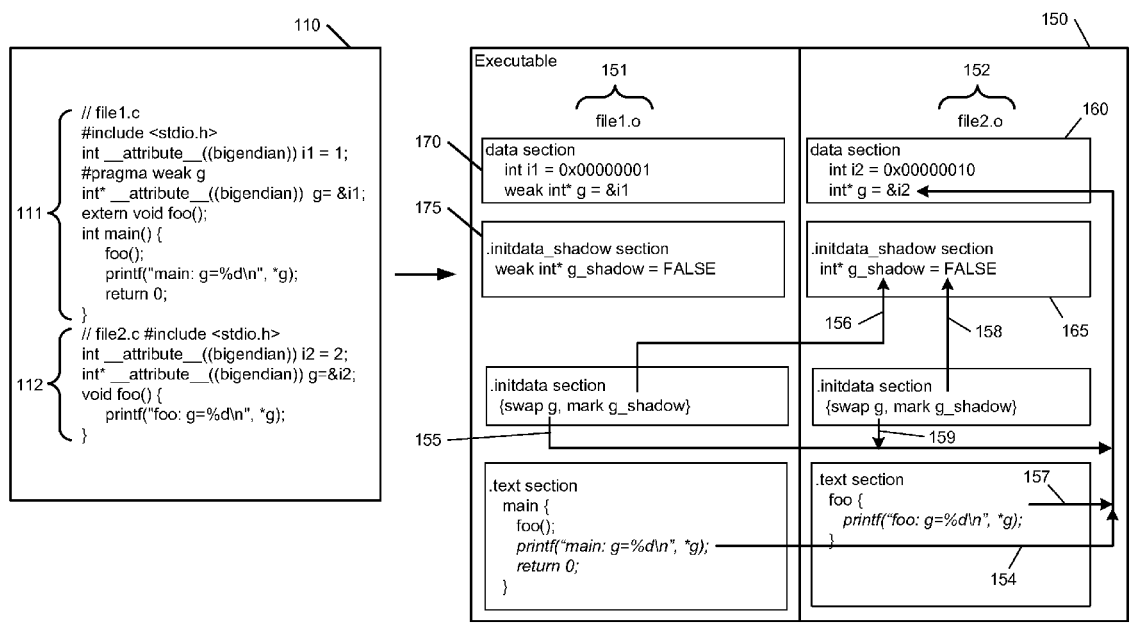
FIG. 1 is a block diagram, including pseudo code, for a method in an embodiment of the invention.

FIG. 1 includes source code 110 and a visual representation of executable code 150. Code 110 may be susceptible to a "duplication problem." Specifically, code 110 includes code portions 111, 112. Each portion includes an instance of global variable "g." Global variable "g" may be initialized twice by conventional compilers: once in code portion 111 (int*_attribute_((bigendian)) g=&i1) and once again in code portion 112 (int*_attribute_((bigendian)) g=&i2). Initialization includes, for example, the process of defining variables by assigning initial values to variables/data structures in a program. Code portions 111, 112 include pointers ((int*_attribute_((bigendian)) g=&i1) and (int*_attribute_ ((bigendian)) g=&i2)) that have big endian attributes but which respectively point to different addresses. Each address has a big endian attribute. Those addresses relate to two different objects ((int_attribute_((bigendian)) i1=1;) and (int_attribute_((bigendian)) i2=2;)). A compiler (e.g., bi-endian compiler) may attempt to convert source code 110 from big endian format or convention to code (e.g., executable code) suitable for a platform having little endian format. To do so, the compiler might perform, for example, a byteswap operation on big endian global variable "g" in both portions 111 and 112. This may lead to a "duplication problem" because "g" is converted from big endian to little endian during the first endian conversion and then "g" is converted from little endian back to big endian in a second conversion. Thus, the duplication problem may occur because "g" is converted twice, thereby reversing the needed conversion from big endian to little endian.

A more specific description of how code 110 might lead to the duplication problem follows. Both source files 111, 112 define global big-endian variable "g". A conventional compiler may initialize global big-endian variable "g" based on different link time constants, even though the address of the link time constant (e.g., i1 or i2) is not known until at link time or after link time (i.e., after compile time). The compiler may not know which particular value of "g" is taken by the link editor or system loader. Thus for each portion 111, 112 the compiler generates a swap operation for "g", even though "g" is a pointer variable that cannot be fully initialized (i.e., correctly initialized) until after compile time. Later, the link editor may only take one instance of "g" resulting in two swap operations that are applied to single instance of "g".

One embodiment of the invention solves the duplication problem as follows:

```
{
    If (g_shadow == FALSE)
    {
        Byteswap(g);
        g_shadow = TRUE;
    } else /* g has been swapped once so do nothing */
}
```

Generally, the above pseudo code illustrates that an embodiment of the invention may use a "shadow variable" to ensure global variable "g" is converted (e.g., byteswapped) one time and that subsequent attempts to convert "g" are suppressed. Upon the initial conversion of "g" the variable "g_shadow" is changed from "FALSE" to "TRUE." Afterwards, the conversion function (e.g., byteswap function) is suppressed because it is conditioned upon "g_shadow" being set to "FALSE."

Thus, in one embodiment of the invention, for each global variable initialized with a link time constant of non native byte order the compiler may generate, within an application, a variable (e.g., invisible "shadow variable"). Shadow variables may be allocated inside a special shadow section so the shadow variables do not interfere with application variables. For example, a reference to a shadow variable may be placed together with a reference to the original variable. Initially, some or all shadow variables may be initialized with a "FALSE" value meaning that the corresponding real application variable has not been swapped yet. Later, during the data initialization process, a "TRUE" value may be placed into each shadow variable the first time a byteswap operation is applied to the corresponding original variable. Once the shadow variable is equal to "TRUE" all consecutive swap operations for the original variable may be suppressed. Thus, in one embodiment of the invention the shadow variable "shadows" the global variable status indicating whether the global variable has or has not been byteswapped and helps ensure the global variable is byteswapped just once.

Returning to FIG. 1, code 150 is a visual representation of compiled code produced from source code 110 using an embodiment of the invention. For global variable "g" code (e.g., compiler) may generate shadow variable "g_shadow" in both code portions 151 and 152 because both of these portions correlate to portions of source code that include "g" (i.e., code portions 111, 112). The "g_shadow" variable is allocated from the ".initdata_shadow" section. The initial value of the "g_shadow" variable is "FALSE." Using code, such as a linker, symbolic references to "g" may be converted (e.g., relocated) from a weak instance of "g" (see schematic block 170) to a strong instance of "g" (see schematic block 160) via schematic arrows 154, 155, 157, 159. A "weak" designation may allow a program, for example, to change a variable's location during program execution. In contrast, a "strong" designation may not allow the program to change the variable's location during program execution. The strong definition of the variable may change the location defined by the weak variable, but not vice versa.

For the same reasons discussed above regarding "g", symbolic weak references to "g_shadow" (block 175) may also be relocated to a single strong instance of "g_shadow" (schematic block 165) via schematic arrows 156, 158. This relocation may be based on relocation information, provided by the compiler that coincides with the arrows that provide relocation direction in block 150. The code version that includes the relocated references to "g" and "g_shadow" is not shown in FIG. 1 but will be addressed with regard to FIG. 2. Later in a post-compile data initialization process, the first byteswap operation may be applied for "g" (which was relocated via relocation information coinciding with arrow 155) and may put "TRUE" at "g_shadow" (which was relocated via relocation information coinciding with arrow 156). Then, when the process encounters the second byteswap operation for "g" (which was relocated via relocation information coinciding with arrow 159) "g_shadow" already has a "TRUE" value (which was relocated via relocation information coinciding with arrow 158) and the swap operation is consequently not performed. Thus, in an embodiment "g" is swapped just once and holds the correct value.

Figure 2:
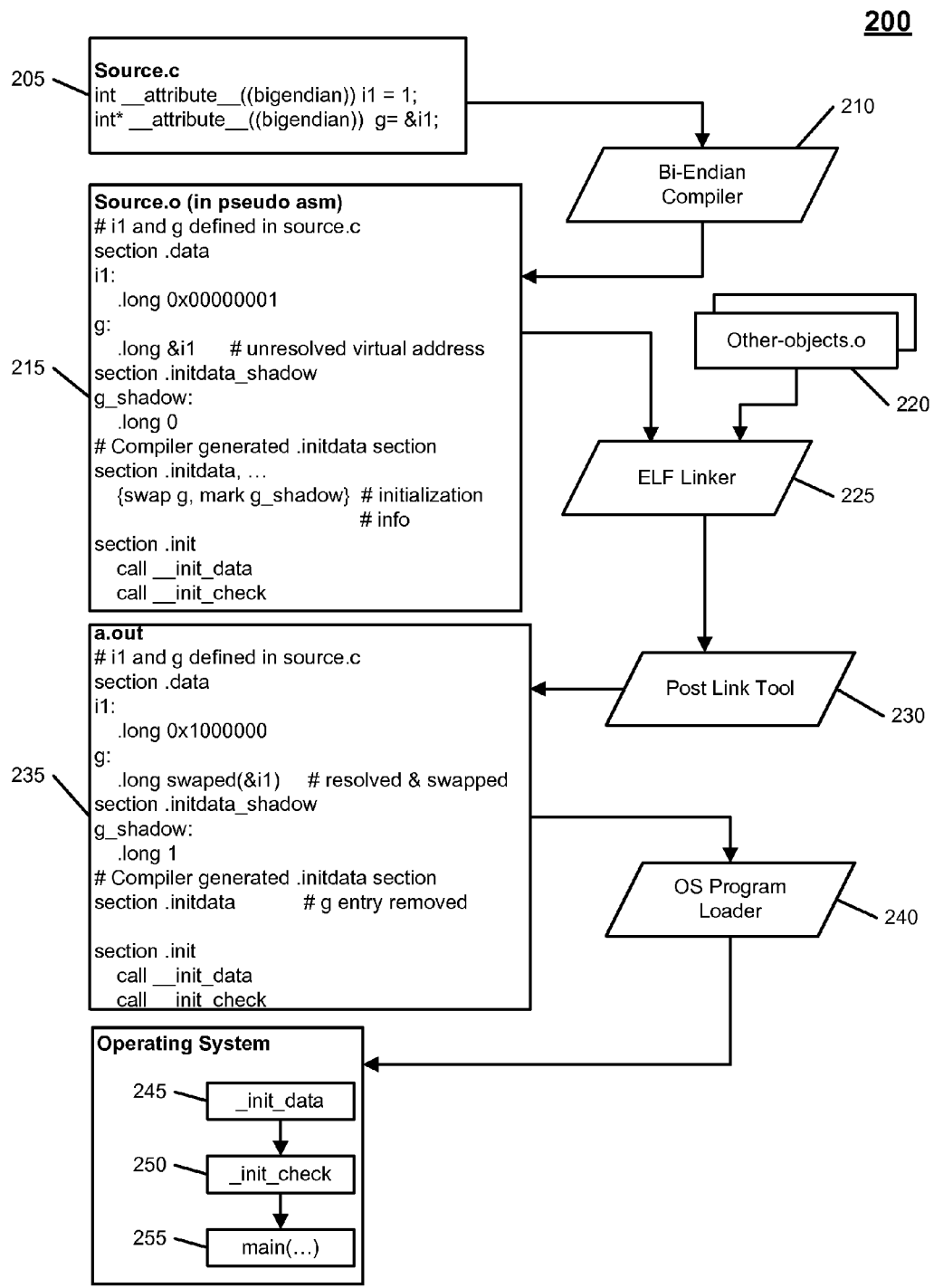
FIG. 2 is a block diagram, including pseudo code, for a method in an embodiment of the invention.

FIG. 2 includes an embodiment of the invention. Method 200 includes source code portion 205, which is analogous to portion 110 of FIG. 1. In block 210 the application is compiled. The compiler may generate initialization data when bi-endian functionality is enabled. The initialization data or information provided by the compiler may include the shadow variables, swap g references, and relocation information related to the shadow variables and swap g references. The compiler may place this initialization data into special Executable and Linking Format (ELF) sections named ".initdata" and ".initdata_shadow", as indicated in block 215. Block 215 is analogous to portion 151 of FIG. 1. Depending on compiler options, this .initdata section may be placed in a loadable segment or a comment segment.

In block 220 other object files, such as portion 152 of FIG. 1, are treated in a similar fashion as block 215 to generate more .initdata sections. Then, in block 225 the linker may combine .initdata sections and relocate g swap and shadow variables (based on relocation information provided by the compiler) in a manner indicated by the arrows in FIG. 1. The .initdata sections may come from various object files and may place the .initdata sections in the linked binary.

In block 230 the code is post-processed using a post-link tool that, in one embodiment of the invention, may be included in the compiler. In other embodiments the post-link tool is separate from the compiler. The post-link tool may read the .initdata section of the executable image and perform initialization for data with values not computed correctly during linking (e.g., global variable addresses such as the "g" variable). Since there might be unresolved references left over, the tool may check if a location does not have relocations, such as those discussed in relation to FIG. 1, associated with it. In that case, the correct value may only be detected during runtime and the swap may not be performed here but instead in block 245 (see below). Otherwise, the data that the address points to may be byteswapped as indicated in block 235 based on the initialization information provided by the compiler. Note that in block 235 some byteswaps have now occurred (e.g., long swapped(&i1)) and some entries from block 215 (e.g., g entry) have been removed. A single section_.initdata section exists due to relocations that occurred previously.

In blocks 240 and 245, dynamic runtime initialization may occur. If there are unperformed byteswaps left from the build in block 230 (e.g., as may occur with dynamically linked applications), they may be performed in block 245 where they are either done by, for example, a runtime initialization routine (e.g., provided by the compiler) which is statically linked with the executable or by a modified operation system (OS) loader before the application enters user code. In the case of runtime initialization, it may be required that data is located to a read-write (R/W) section to get loaded by the OS. These byteswaps may be possible due to the initialization information provided by the compiler.

In block 250 verification may occur. For example, upon application startup a check may be performed to ensure there are no remaining unresolved .initdata records left. Doing so may avoid program malfunctions due to missing endianess corrections inside initialized data. The compiler may generate a runtime check that ensures initialization has been done properly. For an example of such a runtime check, the compiler may create a big-endian "guard" variable for each compilation unit. The "guard variable" may be initialized with a known link time constant value and a routine, which checks if this value has been swapped. If no so such swap occurred, then the application may terminate with an error condition. Otherwise, the application may proceed in block 255.

Thus, various embodiments of the invention concern solutions for data initialization that cannot be fully resolved at compile time. For example, a global variable (e.g., "g" from FIG. 1) may hold an address of another global variable. In that case the exact value to be assigned to the global variable may not be known until the linking stage. Another example of data initialization that cannot be fully resolved at compile time concerns applications that are linked dynamically, where the final values are known only after the dynamic linking stage at run-time. If the actual initializing value is supposed to have a reverse byte order it should be swapped at some stage following dynamic linking and prior to program execution. Yet another example of data initialization that cannot be fully resolved at compile time concerns commonly used Application Binary Interfaces (ABIs) that allow weak definitions of variables. Such weak definitions allow declaring a variable more than once and letting the linker or loader decide which instance of the object is actually taken.

Various embodiments of the invention are tools based and may use a standard ELF file format. This may allow a user to use unmodified ELF based tools like linkers and operating system (OS) loaders with embodiments of the inventions.

Thus, in one embodiment of the invention a programmer desiring to port big endian code to run on a little endian platform (or vice versa) need not rewrite his or her application to run completely in a native single endian mode. Instead, portions of the source code can be designated with a particular endian format, such as components that require the big endian format to interact with network packets. Embodiments of the invention may then provide data that will allow for proper initialization of code portions at a later time. These code portions may include pointer values in a first endian format (e.g., big endian) which must later execute on a platform having a second endian format (e.g., little endian). Various embodiments of the invention provide automatic adjustment of endianess of statically initialized objects, including pointer objects. Some embodiments resolve address ambiguities caused by multiple allocated objects. Also, some embodiments provide runtime detection of missing endianess correction during, for example, application startup. Some embodiments use special compiler generated information to describe non-compile time constant big-endian pointer values. Various embodiments use a post-process tool to correct endianess after a link process has completed. Additional embodiments use special application start-up code, which can correct endianess in case of dynamically linked applications.

Figure 3:
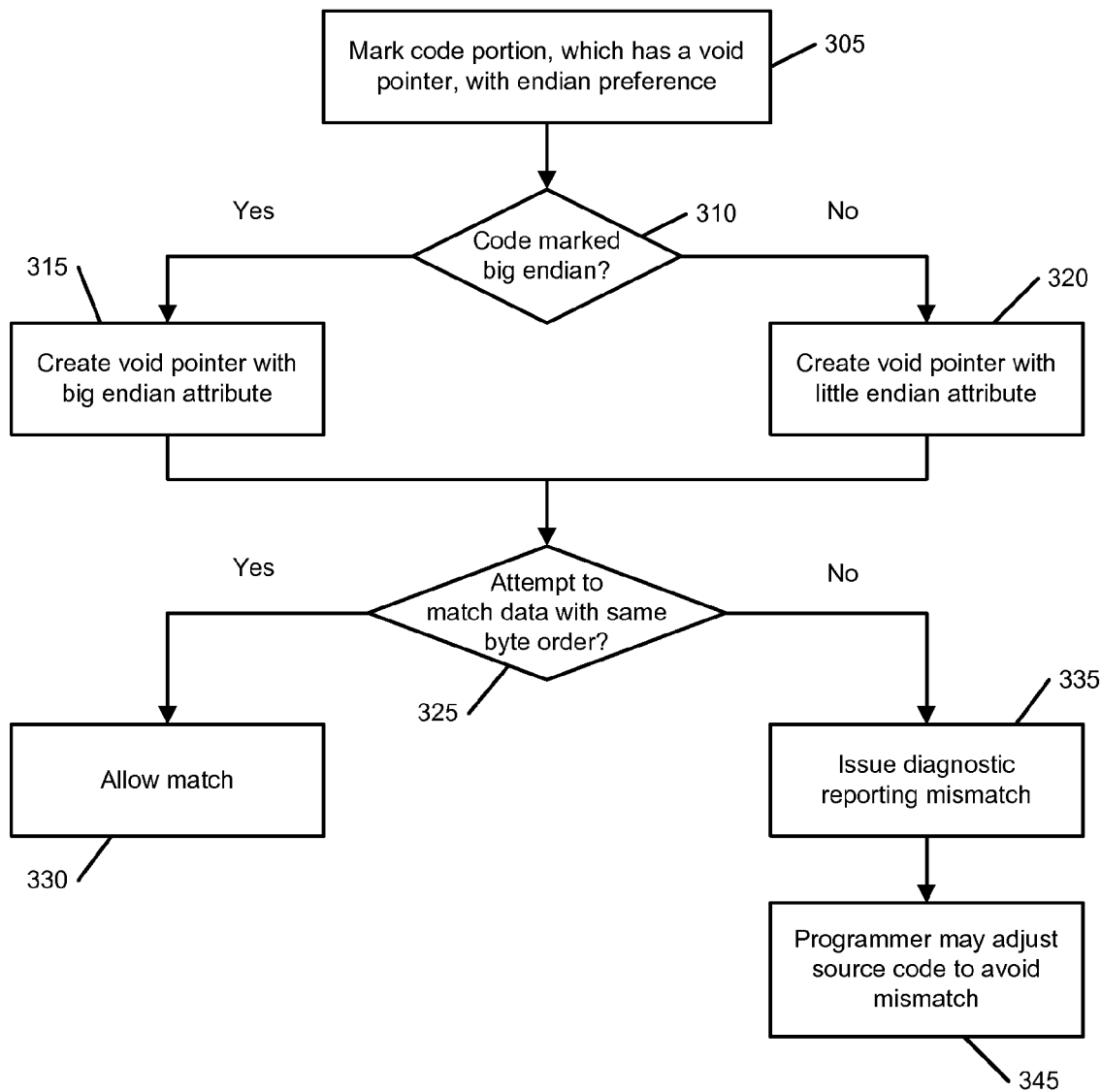
FIG. 3 is a block diagram of a method in an embodiment of the invention.

FIG. 3 is a block diagram of a method in an embodiment of the invention that may address, for example, difficulties caused by analytic code (e.g., bi-endian compiler). One such difficulty concerns compilers that do not track byte order through void pointers. A void pointer may include pointers that point to a value that has unknown type. Another difficulty may include the situation where byte order changes are lost through casting pointers to or from pointers. A "cast" may include a programmer-specified data conversion from one type to another, such as a conversion from integer to floating point. As a result of these example difficulties, some compilers cannot produce diagnostics (e.g., diagnostic reports, prompts, messages, information) that identify potential byte order changes that occur through void pointers. These difficulties can lead to runtime issues. To address these problems, various embodiments of the invention help identify problematic regions of code where, for example, a particular byte order is cast away through void pointers. More specifically, embodiments of the invention may alert the user to potential problematic casts through void pointers, in effect associating a particular void with a byte order region so the user can address the conversion through code modification.

In block 305 of FIG. 3 a programmer may use code (e.g., tools, compiler) to mark regions of code (e.g., data structures) as little or big endian. As explained herein, some regions may be designated as, for example, big endian due to their use with network packets and the like. The compiler may also identify a void pointer is present. In block 310 the endian format may be identified. In block 315, if the void pointer is located in a code section that has been marked big endian, the compiler may create internally a "big-endian void." In block 320, if the void pointer was located in a little endian designated code portion the compiler may create a "little-endian void." While the standard void type may match any language type, a byte order specific void (e.g., "big-endian void" or "little-endian void") may only match, for example, data (e.g., non-aggregate data) with the same byte order and data (e.g., aggregate data) declared (i.e., defined) in the context of the same default byte order. Thus, in block 325 the presence of a mismatch is determined. In block 330, if there is no mismatch then the match may be allowed. However, in block 335 when there is a mismatch the compiler may issue a diagnostic reporting the mismatch (unless the diagnostic is disabled). For example, if a standard void pointer points from a big endian value to a small endian value no issue is ordinarily raised because void pointers are pointers that point to a value that has unknown type (and thus also an undetermined length and undetermined dereference properties). However, such an attempted match with a "big-endian void" may be noted in a diagnostic (block 340) and brought to the programmer's attention where he or she could address the matter in block 345.

Use of the void type name, such as big-endian void, has the byte order attribute of the default byte order implicitly or explicitly (see block 305) assigned to the code region. A typedef may be used to create a void name type for a big and little endian void based on the typedef of the respective default byte order.

Some embodiments of the invention concern a different type void pointer. Specifically, in order to support source conversion to be byte order neutral a family of void types may be created for which the size of the data is captured by the bit size of the data appended to the void name, such as "void32" or "void64." In a manner similar to that explained regarding method 300, these types match types of the same bit size. The source code may be modified to use these names and then the compiler will enforce the size constraint.

Thus, in some embodiments of the invention when the compiler performs a pointer conversion it may determine and issue a diagnostic when any of several situations arise. For example, a diagnostic may be produced when explicitly or implicitly converting to a void pointer from a different byte ordered type (e.g., converting from a big endian value to a little endian value via a void pointer). An "explicit" conversion may occur where, for example, the programmer explicitly writes a cast expression such as:

```
{
    int beint;
    void *p = (void*)&beint; // convert from big-endian int pointer to
    void pointer
}
```

An "implicit" conversion is similar but may include no cast expression as follows:

```
{
    void *p = &beint; // convert from big-endian int pointer to void
    pointer
}
```

Compilers may produce fewer diagnostics for explicit conversions since a cast indicates to the compiler the programmer's actions are likely intentional. However, byte order can be lost through void pointer conversion so, in one embodiment of the invention, a diagnostic may be produced despite the explicit nature of the conversion.

Diagnostics (e.g., reports) may thus be produced in several situations. For example, reports may be issued when (i) explicitly or implicitly converting from a void pointer to a different byte ordered type; (ii) explicitly or implicitly converting to a void pointer from a different byte ordered type; (iii) implicitly converting from a void pointer to another void pointer with a different byte order; and (iv) explicitly or implicitly converting from or to a void size pointer where the underlying type has a different size (e.g., converting from a 32 bit value to a 64 bit value via a void pointer).

Figure 4:
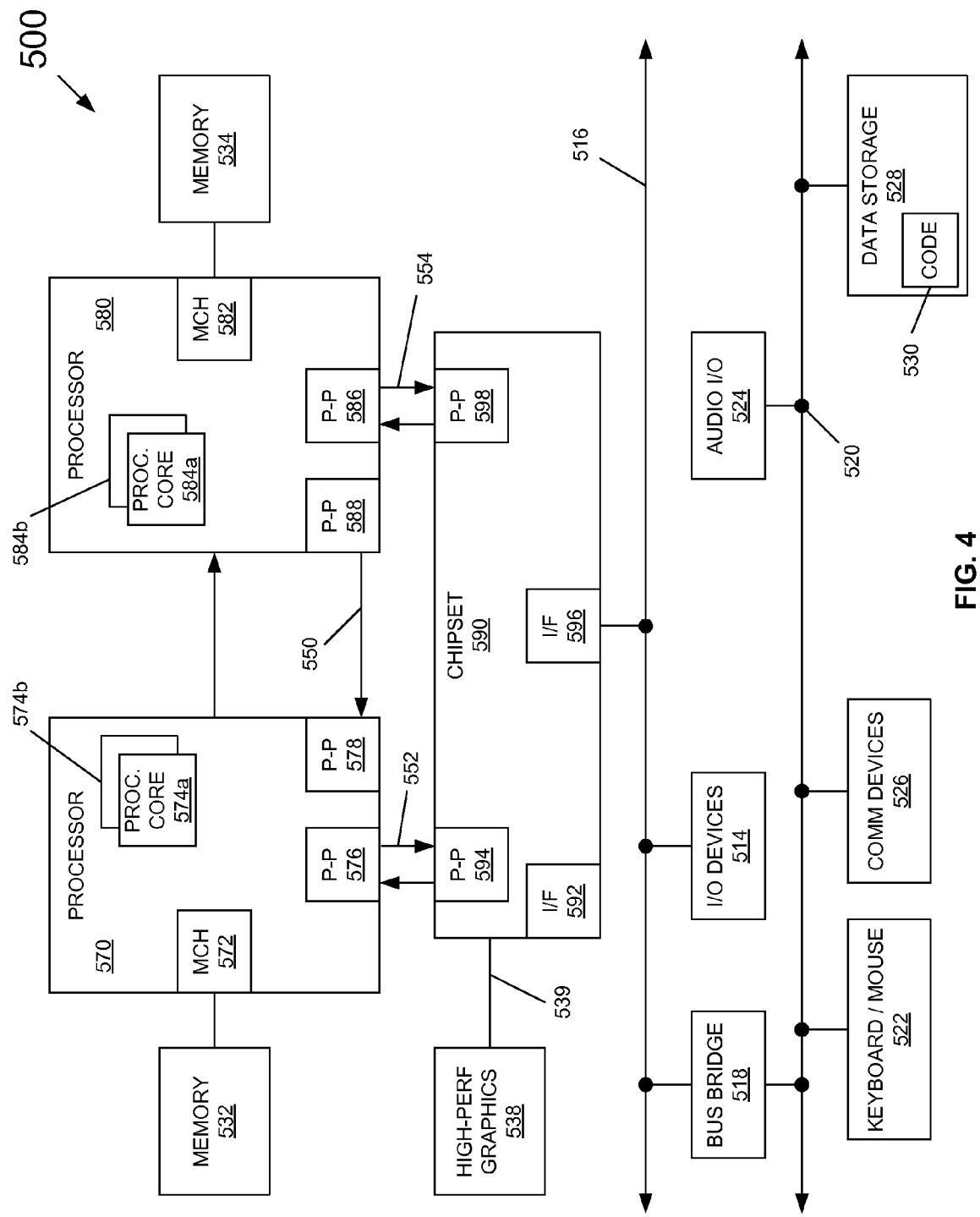
FIG. 4 is a system block diagram for use with an embodiment of the invention.

Embodiments may be implemented in many different system types. Referring now to FIG. 4, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors, including first and second processor cores (i.e., processor cores 574a and 574b and processor cores 584a and 584b), although potentially many more cores may be present in the processors. The term "processor" may refer to any device or portion of a device that processes electronic data from registers and/or memory to transform that electronic data into other electronic data that may be stored in registers and/or memory.

First processor 570 further includes a memory controller hub (MCH) 572 and point-to-point (P-P) interfaces 576 and 578. Similarly, second processor 580 includes a MCH 582 and P-P interfaces 586 and 588. MCHs 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. Chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Endian conversion is often discussed herein with regard to byteswap instructions but various embodiments are not necessarily limited to employing any specific type of instructions to perform or promote endian conversion.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   receiving first and second source code portions that respectively define first and second instances of a global variable, wherein each instance has a first endian format and neither instance can be fully initialized at compile time;
   generating first and second references to byteswap instructions configured to respectively convert the first and second instances to a second endian format;
   generating, using a processor, a shadow variable configured to suppress a byteswap of the second instance after compile time and based on the first instance having been byteswapped; and
   storing the shadow variable in a memory coupled to the processor.

2. The method of claim 1, wherein neither instance can be fully initialized at compile time based on the global variable being a pointer having the first endian format.

3. The method of claim 2, wherein the shadow variable is configured to indicate whether the first instance is byteswapped.

4. The method of claim 2, wherein the shadow variable is configured to suppress the byteswap of the second instance based on the shadow variable having been converted from a weakly defined variable to a strongly defined variable.

5. The method of claim 2 including generating compiled code having both first and second endian formats.

6. The method of claim 2 including generating a guard variable configured to determine, at run time and after initialization of the guard, variable, the guard variable has been byte converted, wherein the guard variable is to be initialized with a known link time constant.

7. The method of claim 2, wherein the first and second instances are configured to be initialized, after compile time, based respectively on first and second link time constants each having the first endian format.

8. The method of claim 1 including:
receiving a third source code portion that includes a void pointer;
tracking byte order through the void pointer; and
determining a byte order mismatch occurred based on the void pointer.

9. The method of claim 1 including: receiving a third source code portion that includes a void pointer;
tracking data size through the void pointer; and
determining a data size mismatch occurred based on the void pointer.

10. An article comprising a non-transitory storage medium storing instructions that enable a processor-based system to:
receive first and second code portions that respectively define first and second instances of a global variable, wherein each instance of the global variable has a first endian format and neither instance can be correctly initialized at compile time; and
generate a first variable configured to suppress endian conversion of the second instance after compile time and based on the first instance having been endian converted.

11. The article of claim 10, wherein the global variable is a pointer.

12. The article of claim 11, further storing instructions that enable the system to relocate the first variable based on information generated from a compiler, wherein the first variable is configured to suppress the endian conversion of the second instance based on the relocation.

13. The article of claim 11, wherein the first instance is based on an address of a second global variable.

14. The article of claim 11, wherein the first and second code portions are configured to be linked dynamically.

15. The article of claim 10, further storing instructions that enable the system to:
receive a third code portion that includes a void pointer;
track byte order through the void pointer; and
determine a byte order mismatch occurred based on the void pointer.

16. An apparatus comprising:
a processor, coupled to a memory, to:
(1) receive, using the memory, first and second source code portions that respectively define first and second instances of a global variable, wherein each instance of the global variable has a first endian format and neither instance can be fully initialized at compile time; and
(2) generate a first variable configured to suppress a byteswap of the second instance after compile time and based on the first instance having been byteswapped.

17. The apparatus of claim 16, wherein the global variable is a pointer.

18. The apparatus of claim 17, wherein the first variable is configured to suppress the byteswap of the second instance based on the first variable having been converted from a weakly defined variable to a strongly defined variable.

19. The apparatus of claim 17, wherein the first and second code portions are configured to be linked dynamically.

20. The apparatus of claim 16, wherein the processor is to: receive a third source code portion that includes a void pointer; track byte order through the void pointer; and determine a byte order mismatch occurred based on the void pointer.

* * * * *